United States Patent
Le Jaouen et al.

(10) Patent No.: US 9,022,459 B2
(45) Date of Patent: May 5, 2015

(54) ASSEMBLY FOR FASTENING OF A STEERING COLUMN FOR A MOTOR VEHICLE

(75) Inventors: Guillaume Le Jaouen, Montigny le Bretonneux (FR); Rabih Saadi, Massy (FR)

(73) Assignee: RENAULT s.a.s., Boulogne-billancourt (FR)

( * ) Notice: Subject to any disclaimer, the term of this patent is extended or adjusted under 35 U.S.C. 154(b) by 0 days.

(21) Appl. No.: 13/640,397

(22) PCT Filed: Feb. 16, 2012

(86) PCT No.: PCT/FR2012/050336
§ 371 (c)(1),
(2), (4) Date: Jan. 18, 2013

(87) PCT Pub. No.: WO2012/114019
PCT Pub. Date: Aug. 30, 2012

(65) Prior Publication Data
US 2014/0361572 A1  Dec. 11, 2014

(30) Foreign Application Priority Data
Feb. 21, 2011 (FR) ...................... 11 51384

(51) Int. Cl.
*B62D 25/14* (2006.01)
*B62D 1/16* (2006.01)

(52) U.S. Cl.
CPC ............... *B62D 1/16* (2013.01); *B62D 25/145* (2013.01); *B62D 25/14* (2013.01)

(58) Field of Classification Search
CPC ..... B62D 25/14; B62D 25/145; B62D 25/147
USPC ............... 296/193.02, 72, 203.02, 193.05, 296/193.06; 180/90
See application file for complete search history.

(56) References Cited

U.S. PATENT DOCUMENTS

| | | | | | |
|---|---|---|---|---|---|
| 4,682,788 | A | * | 7/1987 | Yoshimura | 280/779 |
| 4,690,432 | A | * | 9/1987 | Sakamoto et al. | 280/775 |
| 4,767,153 | A | * | 8/1988 | Kawasaki et al. | 296/193.02 |
| 5,238,286 | A | * | 8/1993 | Tanaka et al. | 296/70 |
| 5,810,393 | A | * | 9/1998 | Joest et al. | 280/779 |
| 6,450,533 | B1 | * | 9/2002 | Kimura et al. | 280/779 |
| 6,517,145 | B2 | * | 2/2003 | Hedderly | 296/192 |
| 6,523,878 | B2 | * | 2/2003 | Scheidel | 296/70 |

(Continued)

FOREIGN PATENT DOCUMENTS

FR    2 928 897    9/2009

OTHER PUBLICATIONS

French Search Report Issued Oct. 6, 2011 in FR1151384 Filed Feb. 21, 2011.

(Continued)

*Primary Examiner* — Gregory Blankenship
(74) *Attorney, Agent, or Firm* — Oblon, McClelland, Maier & Neustadt, L.L.P.

(57) ABSTRACT

An assembly for attaching a steering column for a motor vehicle that is to be attached to a cross-member of a firewall and to a bottom cross-member of a window opening. The assembly includes a support member that extends substantially vertically, which is to be attached to the firewall cross-member and to the bottom cross-member of the window opening, and which supports a mechanism for attaching a plate of the steering column.

16 Claims, 2 Drawing Sheets

(56) References Cited

U.S. PATENT DOCUMENTS

| | | | |
|---|---|---|---|
| 6,648,402 B2 * | 11/2003 | Scheib et al. | 296/203.02 |
| 6,843,521 B1 * | 1/2005 | Oana | 296/70 |
| 6,851,742 B1 * | 2/2005 | Kubiak | 296/193.02 |
| 7,025,411 B2 * | 4/2006 | Dettinger et al. | 296/193.02 |
| 7,150,489 B2 * | 12/2006 | Yoshida et al. | 296/72 |
| 7,374,232 B2 * | 5/2008 | Ellison et al. | 296/193.02 |
| 7,503,622 B2 * | 3/2009 | Vican | 296/190.03 |
| 7,571,950 B2 * | 8/2009 | Baudart | 296/72 |
| 7,832,795 B2 * | 11/2010 | Yokoi et al. | 296/204 |
| 8,141,903 B2 * | 3/2012 | Atsumi et al. | 280/779 |
| 8,317,256 B2 * | 11/2012 | Da Costa Pito et al. | 296/193.02 |
| 8,342,599 B2 * | 1/2013 | Atsumi et al. | 296/193.02 |
| 2002/0024236 A1 | 2/2002 | Scheib et al. | |
| 2005/0140179 A1 * | 6/2005 | Morsch et al. | 296/204 |
| 2008/0048470 A1 * | 2/2008 | Vican | 296/193.02 |
| 2008/0315611 A1 * | 12/2008 | Durocher | 296/72 |
| 2010/0090451 A1 * | 4/2010 | Atsumi et al. | 280/779 |
| 2014/0217780 A1 * | 8/2014 | Vican et al. | 296/193.02 |

OTHER PUBLICATIONS

International Search Report Issued Jun. 4, 2012 in PCT/FR12/050336 Filed Feb. 16, 2012.

* cited by examiner

ASSEMBLY FOR FASTENING OF A STEERING COLUMN FOR A MOTOR VEHICLE

The invention relates to an assembly for fastening of a steering column for a motor vehicle.

The steering elements of a motor vehicle, which are the steering column and the steering wheel, are usually supported on the driver's side, inside the interior space, by means in particular of a transversal bar, or firewall cross member, disposed between two feet in turn supporting the windshield or else the front door hinges, the front feet or side pillars extending as uprights of the opening for the windshield.

Usually a tube connects the front feet and a support is assembled as close as possible to the fastenings of the steering column. The objective of such an arrangement is to reduce any overhang, which proves to be highly unfavorable in the case of collision and detrimental to the comfort level, because it generates vibrations.

The prior art solutions are incompatible with a new architecture of the driver's position, because of the installation of numerous elements, such as glove-box compartments, a handbrake support or even diverse electronic control units on both sides of the steering column. This new architecture of the driver's position is intended in particular as equipment for certain motor vehicles, especially of the single-seater, two-seater or three-seater type, for which the chassis architecture is specific.

In such a specific chassis architecture, on the one hand the equivalents of the front feet of a traditional vehicle do not rise to the height of the steering-column fastenings, for reasons related to collision and to the resulting weight increase. On the other hand, as mentioned in the foregoing, it is not possible to envision the usual use of a tube routed transversely across the dashboard, because of the installation of numerous elements, such as glove-box compartments, a handbrake support or even diverse electronic control units. In fact, in this type of vehicle, the glove-box compartments are preferably located on both sides of the steering-column support in the transverse direction, at a height close to this same support. A handbrake device is disposed next to the steering column at substantially equal height, while the electronic control units are housed in cavities provided for the purpose, not far from the steering-column support.

One of the difficulties also lies in the fact of permitting a displacement of the steering wheel substantially along the longitudinal axis and along the vertical axis in order to guarantee correct deployment of the airbag in the case of a head-on collision. In addition, the displacements of the steering wheel substantially along the longitudinal and vertical axes must be permitted by and equipped with blocking means to ensure any adjustment that may be necessary to fit the morphology of the driver.

The objective is also to use a steering-column plate that may also be used on another vehicle.

The objective of the present invention is to provide an assembly for fastening of a steering column for a motor vehicle that overcomes the problems illustrated in the foregoing and improves the known prior art assemblies. In particular, the invention relates to an assembly for fastening of a steering column that is compatible with a specific motor-vehicle body architecture, capable of accommodating a dashboard containing equipment on both sides of the steering column, such as glove boxes, electronic elements or a handbrake.

According to the invention, the assembly makes it possible to fasten a motor-vehicle steering column intended to be fastened on the one hand to a firewall cross member and on the other hand to a lower cross member of the opening for the windshield. It comprises a support member extending substantially vertically, intended to be fastened to the firewall cross member and to the lower cross member of the opening for the windshield, and supporting a means for fastening of a steering-column plate.

The support member may comprise two uprights intended to be fastened on both sides of the firewall cross member in the longitudinal direction.

The support member may comprise four uprights intended to be fastened in pairs on both sides of the firewall cross member in the longitudinal direction.

The fastening means may comprise a transversal element fastened on two uprights intended to be fastened on the same side of the firewall cross member in the longitudinal direction.

The fastening means may comprise a longitudinal element fastened on two uprights intended to be fastened on both sides of the firewall cross member.

The fastening means may comprise a longitudinal element fastened on a transversal element.

The support member may comprise a plate intended to be fastened on the lower cross member of the opening for the windshield.

According to the invention, the motor-vehicle body structure comprises an assembly for fastening of a steering column defined in the foregoing, wherein a firewall cross member and a lower cross member of the opening for the windshield are integral with front side pillars supporting a windshield.

According to the invention, the motor vehicle comprises an assembly for fastening a steering column defined in the foregoing or a body structure defined in the foregoing.

Other characteristics and advantages of the invention will become apparent upon reading the description of one embodiment, which will now be provided with reference to the attached drawings, wherein.

Figure 1:
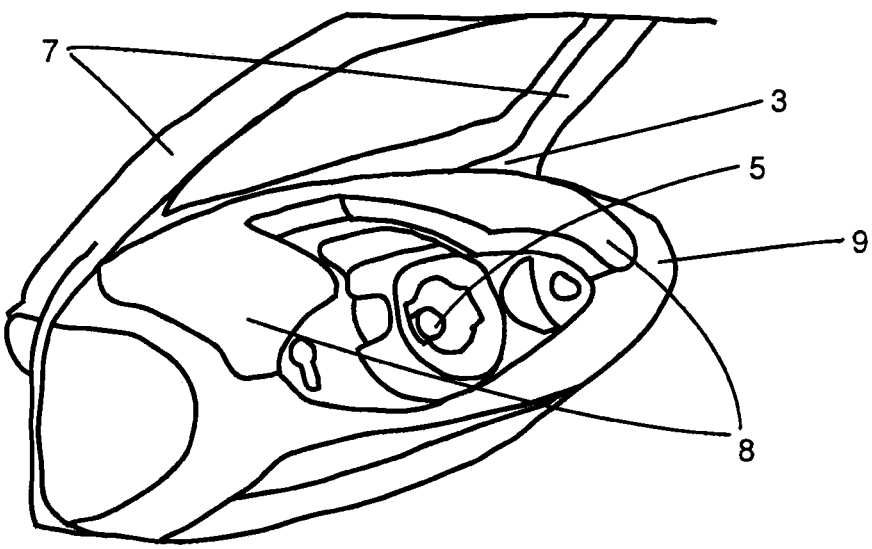
FIG. 1 represents a dashboard containing one embodiment of an assembly for fastening of the steering column according to the invention.

An embodiment of an assembly 100 for fastening of a steering column of a motor vehicle is described hereinafter with reference to FIGS. 1 to 3.

The fastening assembly is intended to be fastened to a structure so as to form together therewith a motor-vehicle body. In particular, the assembly is intended to be fastened to a lower cross member 3 of the opening for the windshield and to an upper front-face cross member 2. Assembly 100 for fastening of steering 5 has the function of assuring robust fastening of steering column 5 on a motor-vehicle body. The firewall cross member or front-face cross member is an essential cross member of the chassis structure, on which there may be fastened additional elements and on which there are fastened other bars of the chassis structure. The lower cross member 3 of the opening for the windshield is the cross member on which there is fastened the lower part of the windshield.

Assembly 100 for fastening of steering column 5 comprises a support member 1 extending substantially vertically and a means 15, 15', 14 for fastening of steering column 5, especially a steering-column plate.

Support member 1 is intended to be fastened on the one hand to lower cross member 3 of the opening for the windshield and on the other hand to the upper front-face cross member or firewall cross member 2. Support member 1 makes it possible to support means 15, 15', 14 for fastening of steering column 5.

Figure 2:
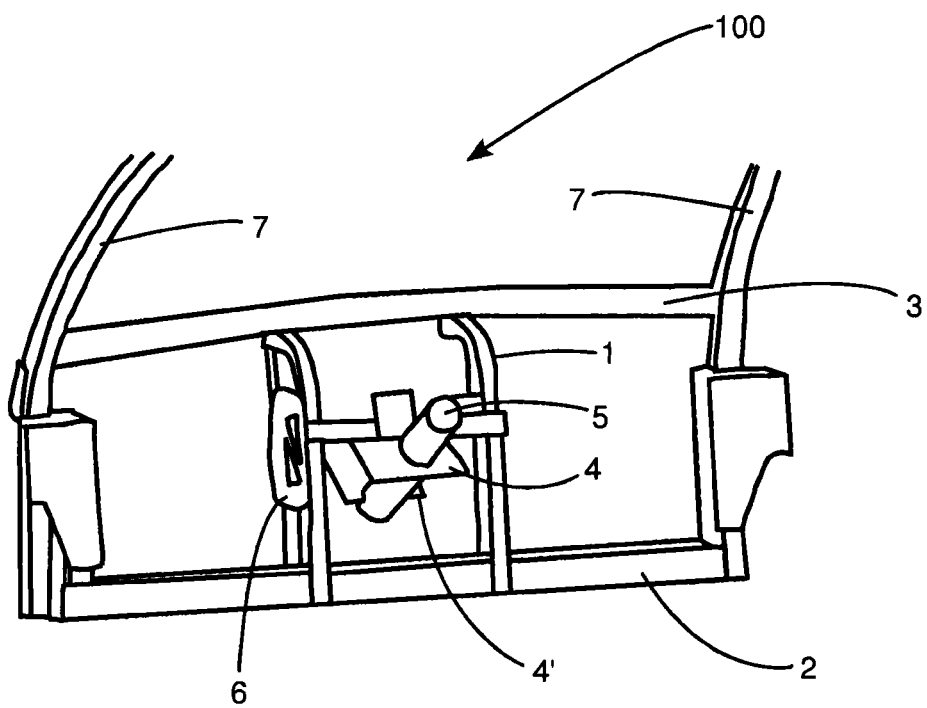
FIG. 2 represents a perspective view of the embodiment for fastening of a steering column according to the invention fastened to a motor-vehicle body.

In FIGS. 1 and 2, the fastening assembly is mounted on a structure in order to form a body. Support member 1 is therefore fastened on the one hand to lower windshield cross member 3 and on the other hand to firewall cross member 2.

Furthermore, this body comprises side pillars 7 supporting a windshield, these side pillars being attached to lower cross member 3 of the opening for the windshield and to firewall cross member 2. This body makes it possible to accommodate a dashboard 9 having a steering-column passage. As shown more particularly in FIG. 2, this body does not have a dashboard cross member as is usually the case for traditional vehicles, but this dashboard is positioned substantially between lower cross member 3 of the opening for the windshield and firewall cross member 2. Dashboard 9 comprises, for example, one or more glove box compartments 8, for example two, on both sides of steering column 5.

Figure 3:
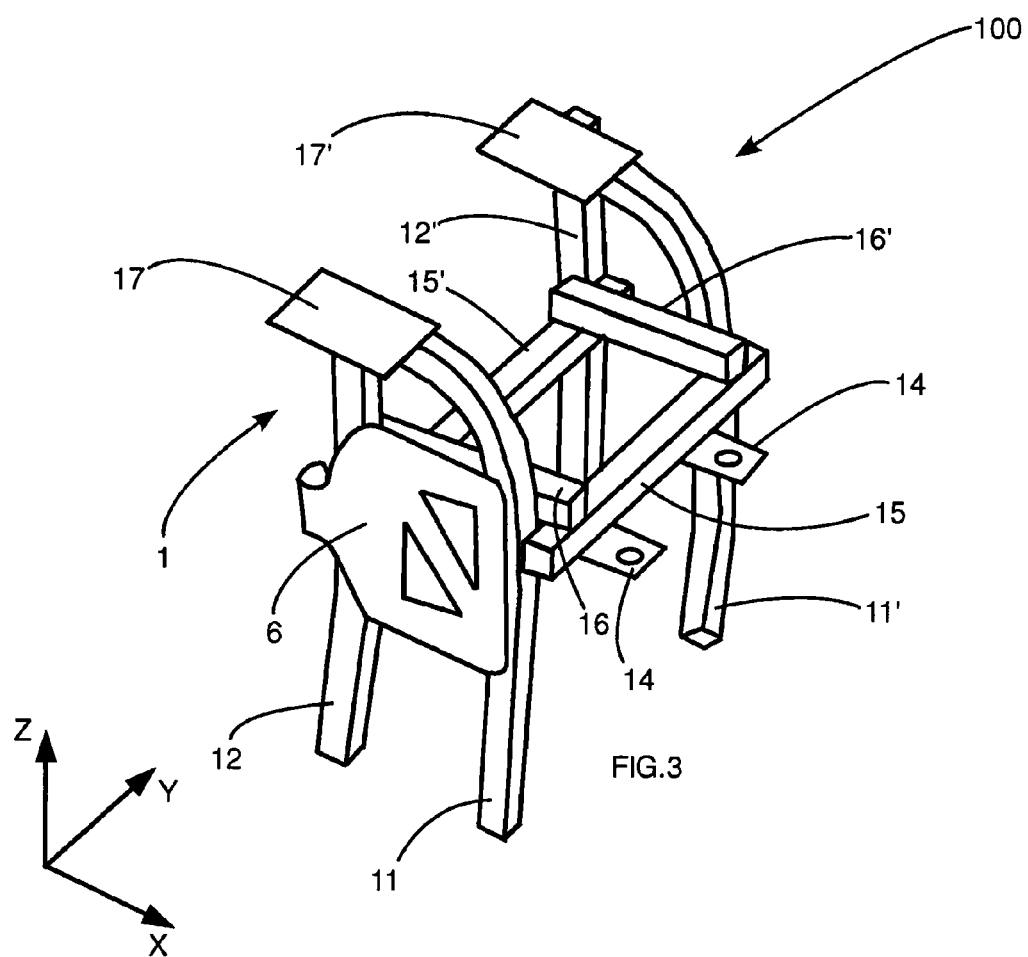
FIG. 3 represents a perspective view of a support member 1 according to the invention.

In these figures, the longitudinal direction is represented by an axis X, the transversal direction by an axis Y and the vertical direction by an axis Z (FIG. 3).

Preferably support member 1 comprises four uprights 11, 12, 11', 12', extending substantially vertically. These uprights are intended to be fastened in pairs on both sides of firewall cross member 2 along the longitudinal axis, by any fastening means, for example by screws, bolts, rivets or welds. Thus upright 12 is fastened to the front of the firewall cross member and upright 11 is fastened to the rear of the firewall cross member. Similarly, upright 12' is fastened to the front of the firewall cross member and upright 11' is fastened to the rear of the firewall cross member. In the case of weld beads, the beads may be vertical and two in number for each upright. The merit of a support member 1 with four uprights 11, 12, 11', 12' fastened in this way to firewall cross member 2 is to guarantee great stability of steering column 5 by absorbing the moments around axes X, Y and Z.

The upper ends of uprights 11 and 11' are preferably curved toward the front of the vehicle and are made integral respectively with the ends of uprights 12 and 12' by any fastening means, such as screws, bolts, rivets or welds. The fastening of the support member to the lower cross member of the opening for the windshield is achieved at these ends, preferably by way of plates 17 and 17' provided to facilitate fastening of support member 1 on lower cross member 3 of the opening for the windshield, especially via screws, bolts, rivets or welds.

The means for fastening of steering column 5 may comprise at least one transversal element 15, 15' fastened to the support member, especially two transversal elements 15, 15' respectively extending transversely between the two uprights 11 and 11' and between the two uprights 12, 12'. The transversal element or the transversal elements 15, 15' is or are intended to accommodate the steering column, especially a plate 4, 4' of steering column 5. For this purpose, transversal elements 15 and 15' make it possible to integrate fastening gussets 14 disposed in a substantially horizontal plane, preferably four in number, in other words two on transversal element 15 and two on transversal element 15'. These fastening gussets 14 receive the plate or plates 4, 4' traversed by steering column 5 and fastened thereto. These gussets are part of the fastening means.

Uprights 11 and 12 or 11' and 12' may receive a handbrake support 6.

The fastening means may comprise at least one longitudinal element 16, 16' fastened respectively on two uprights 11 and 12 and 11' and 12'. The fastening means may comprise at least one longitudinal element 16, 16' fastened on at least one transversal element 15, 15'. The fastening means may comprise longitudinal elements 16, 16' fastened both on transversal elements 15, 15' and respectively on two uprights 11 and 12 and 11' and 12'. The assembly is achieved by screws, bolts, rivets and preferably welds. Here again the objective of such an arrangement is to increase the rigidity.

Uprights 11 and 12 or uprights 11' and 12' make it possible in particular to maintain a handbrake support 6, which has the form, for example, of an openwork plate positioned in a substantially vertical and longitudinal plane.

Uprights 11 and 11' and 12 and 12' may be of square, round, rectangular or other cross section. They are, for example, symmetric or substantially symmetric relative to a vertical longitudinal plane passing, for example, through the middle of the vehicle.

In summary, the structure of assembly 100 is related to the structure of a chair, which assures stability for flexion around the transversal axis, in case of head-on collision, and flexion of steering column 5.

For example, support member 1 is made from steel sheet of 1.2 mm thickness, especially from steel sheet of 1.2 mm thickness and/or of type TSE220 +CR2 (EN 10305-5 standard).

Support member 1 may be obtained by one or more deep-drawn or molded parts or parts made by cutting of sheets, which may or may not have identical thicknesses. The number of parts constituting member 1 may be reduced.

In a second embodiment, support member 1 comprises a single part extending substantially along the vertical axis, provided with means for attachment to lower cross member 3 of the opening for the windshield and means for attachment to firewall cross member 2 as well as means for attachment to the means for fastening on a plate 4, 4' of steering column 5. Advantageously it also comprises a handbrake support 6.

In a third embodiment, support member 1 comprises two uprights 11, 12, each being intended to be fastened on both sides of firewall cross member 2 along the longitudinal axis, by any means, for example by screws, bolts, rivets or welds. The advantage of a support member 1 with two uprights 11, 12 fastened in this way is to guarantee stability for steering column 5. Support member 1 is then able to support the means for fastening of steering column 5 and a handbrake support 6.

The invention may be suitable in particular for a vehicle of single-seater or even two-seater or three-seater type (with two rear seats and one driver seat), the passenger seat or seats being situated, for example, behind the driver seat.

The two fastenings on the lower cross member of the opening for the windshield via the plates contribute substantially to the rigid mounting of the structure.

The invention has numerous advantages, such as:
furnishing a robust fastening of steering column 5 of a motor vehicle, without traditional dashboard cross member,
assuring accommodation of an assembly comprising a column-support plate 4, 4' as well as a column 5 originating from vehicle models already manufactured, lowering the costs of industrial application of the solution,
permitting the installation of a handbrake support 6 on one of the sides of assembly 100 for fastening of steering column 5, in other words not situated on the vehicle floor as in the usual case,
permitting the installation of glove box compartments 8, for example on both sides of support member 1,
permitting the insertion of electronic elements in the body of the dashboard.

This type of invention may also be used for motor vehicles that lean during cornering, such as certain vehicles equipped with two front wheels and a single rear wheel.

The invention makes it possible to assure robust fastening of a steering column to the body of a motor vehicle in order to assure the driver of an acceptable level of vibratory comfort during operation of the vehicle.

The invention claimed is:

1. An assembly for fastening a steering column for a motor vehicle configured to be fastened to a firewall cross member and to a lower cross member of an opening for a windshield, the assembly comprising:
    a support member that extends substantially vertically and supports a fastening portion that fastens a plate of the steering column, the support member including
        a firewall cross member attachment portion configured to be fastened to the firewall cross member and
        a lower cross member attachment portion configured to be fastened to the lower cross member of the opening for the windshield.

2. An assembly for fastening a steering column for a motor vehicle according to claim 1, wherein the support member comprises two uprights configured to be fastened on both sides of the firewall cross member in the longitudinal direction.

3. An assembly for fastening a steering column for a motor vehicle according to claim 1, wherein the support member comprises four uprights configured to be fastened in pairs on both sides of the firewall cross member in the longitudinal direction.

4. An assembly for fastening a steering column for a motor vehicle according to claim 3, wherein the fastening portion comprises a transversal element fastened on two uprights configured to be fastened on a same side of the firewall cross member in the longitudinal direction.

5. An assembly for fastening a steering column for a motor vehicle according to claim 4, wherein the fastening portion comprises a longitudinal element fastened on two uprights configured to be fastened on both sides of the firewall cross member.

6. An assembly for fastening a steering column for a motor vehicle according to claim 4, wherein the fastening portion comprises a longitudinal element fastened on the transversal element.

7. An assembly for fastening a steering column for a motor vehicle according to claim 1, wherein the support member comprises a plate configured to be fastened on the lower cross member of the opening for the windshield.

8. A motor-vehicle body structure, comprising:
    an assembly for fastening of a steering column according to claim 1, wherein a firewall cross member and a lower cross member of the opening for the windshield are integral with front side pillars that support the windshield.

9. A motor vehicle, comprising:
    an assembly for fastening of a steering column according to claim 1.

10. An assembly for a motor vehicle, comprising:
    a lower cross member of an opening for a windshield;
    a firewall cross member that is a cross member of a chassis structure of the motor vehicle;
    a support member that extends substantially vertically and is fastened to the firewall cross member and to the lower cross member; and
    a steering column that extends at least partly along a longitudinal direction of the vehicle and is supported by the support member at an intermediate position between the lower cross member and the firewall cross member.

11. An assembly according to claim 10, further including a handbrake support that is supported by the support member at a transverse position on a side of the support member opposite the intermediate position at which the support member supports the steering column.

12. An assembly for fastening a steering column for a motor vehicle configured to be fastened to a firewall cross member and to a lower cross member of an opening for a windshield, the assembly comprising:
    a support member that extends substantially vertically and supports a means for fastening of a plate of the steering-column, the support member being configured to be fastened to the firewall cross member and to the lower cross member of the opening for the windshield, wherein the support member comprises two uprights configured to be fastened on both sides of the firewall cross member in the longitudinal direction.

13. An assembly for fastening a steering column for a motor vehicle according to claim 12, wherein the support member comprises four uprights configured to be fastened in pairs on both sides of the firewall cross member in the longitudinal direction.

14. An assembly for fastening a steering column for a motor vehicle according to claim 13, wherein the fastening means comprises a transversal element fastened on two uprights configured to be fastened on a same side of the firewall cross member in the longitudinal direction.

15. An assembly for fastening a steering column for a motor vehicle according to claim 14, wherein the fastening means comprises a longitudinal element fastened on two uprights configured to be fastened on both sides of the firewall cross member.

16. An assembly for fastening a steering column for a motor vehicle according to claim 14, wherein the fastening means comprises a longitudinal element fastened on the transversal element.

* * * * *